(12) United States Patent
Thacker et al.

(10) Patent No.: US 7,289,460 B1
(45) Date of Patent: Oct. 30, 2007

(54) SATELLITE COMMUNICATIONS SYSTEM

(75) Inventors: John C. Thacker, Los Altos, CA (US); Steven R. Peterson, Merion Station, PA (US); Scott Blanchard, Mesa, AZ (US); Gregory E. Edlund, Torrance, CA (US)

(73) Assignees: Lockheed Martin Corporation, Bethesda, MD (US); General Dynamics Decision Systems, Inc., Scottsdale, AZ (US)

( * ) Notice: Subject to any disclaimer, the term of this patent is extended or adjusted under 35 U.S.C. 154(b) by 901 days.

(21) Appl. No.: 10/462,094

(22) Filed: Jun. 12, 2003

Related U.S. Application Data

(60) Provisional application No. 60/388,310, filed on Jun. 14, 2002.

(51) Int. Cl.
*H04B 7/216* (2006.01)

(52) U.S. Cl. ...................................... 370/320
(58) Field of Classification Search ................ 370/320, 370/316, 335, 441, 479; 455/430
See application file for complete search history.

(56) References Cited

U.S. PATENT DOCUMENTS

| | | | | |
|---|---|---|---|---|
| 4,455,651 A | * | 6/1984 | Baran | 370/320 |
| 4,901,307 A | * | 2/1990 | Gilhousen et al. | 370/320 |
| 5,073,900 A | * | 12/1991 | Mallinckrodt | 370/320 |
| 5,084,900 A | * | 1/1992 | Taylor | 370/320 |
| 5,303,286 A | * | 4/1994 | Wiedeman | 455/428 |
| 5,313,457 A | * | 5/1994 | Hostetter et al. | 370/320 |
| 5,327,455 A | * | 7/1994 | De Gaudenzi et al. | 370/207 |
| 5,533,023 A | * | 7/1996 | Ohlson et al. | 370/319 |
| 5,592,471 A | * | 1/1997 | Briskman | 455/506 |
| 5,654,955 A | * | 8/1997 | Natali | 370/320 |
| 5,668,975 A | * | 9/1997 | Coddington | 711/169 |
| 5,764,630 A | * | 6/1998 | Natali et al. | 370/320 |

(Continued)

OTHER PUBLICATIONS

UHF SATCOM downlink interference for the mobile platformFranke, E.; Military Communications Conference, 1996. MILCOM '96, Conference Proceedings, IEEE□□vol. 1, Oct. 21-24, 1996 pp. 22-28 vol. 1.*

(Continued)

*Primary Examiner*—Wing Chan
*Assistant Examiner*—Lawrence J Burrowes
(74) *Attorney, Agent, or Firm*—Marsh, Fischmann & Breyfogle LLP

(57) ABSTRACT

Embodiments of the present invention are directed to a satellite communications system between satellites and terminal units that are sufficiently small to be handheld units and that operate within the earth power flux density limit. This is accomplished by using spreading spectrum waveform protocols that make efficient use of the allocated bandwidth. In one embodiment, a satellite communications system comprises at least one satellite, and at least one ground station each corresponding to one of the at least one satellite. Each ground station includes a spread spectrum transmitter and a spread spectrum receiver. Each of a plurality of mobile terminals includes a spread spectrum transmitter and a spread spectrum receiver. The spread spectrum transmitter of the at least one ground station is configured to communicate via the corresponding satellite with the spread spectrum receivers of the mobile terminals, and the spread spectrum receiver of the at least one ground station is configured to communicate via the satellite with the spread spectrum transmitter of the mobile terminals, using spread spectrum signals generated from baseband information signals narrower in bandwidth than the spread spectrum signals.

24 Claims, 1 Drawing Sheet

U.S. PATENT DOCUMENTS

| | | | |
|---|---|---|---|
| 5,796,760 A * | 8/1998 | Wiedeman et al. | 375/130 |
| 5,940,379 A * | 8/1999 | Startup et al. | 370/320 |
| 5,956,619 A * | 9/1999 | Gallagher et al. | 455/12.1 |
| 6,052,364 A * | 4/2000 | Chalmers et al. | 370/312 |
| 6,253,077 B1 * | 6/2001 | Burt et al. | 455/424 |
| 6,542,493 B1 * | 4/2003 | Moerder | 370/342 |
| 6,996,077 B1 * | 2/2006 | Suenaga et al. | 370/320 |
| 7,031,702 B2 * | 4/2006 | Karabinis et al. | 455/427 |

OTHER PUBLICATIONS

The Effect of Dual Satellite Diversity on the Total Capacity of Multiple Band-Shared CDMA LEOS Systems Vojcic et al, Communications, 1994. ICC 94, SUPERCOMM/ICC '94, Conference Record, Serving Humanity Through Communications. IEEE International Conference on May 1-5, 1994 pp. 1141-1144 vol. 2.*

Multi-User Transparent-Dehop Milsatcom System, Hovanessian et al, ☐☐Military Communications Conference, 1995. MILCOM '95, Conference Record, IEEE☐☐vol. 1, Nov. 5-8, 1995 pp. 340-346 vol. 1.*

Roberts, Randy, *Spread Spectrum*, "The ABCs of Spread Spectrum —A Tutorial," [online] Aug. 2002. [Retrieved on Aug. 12, 2002 from the internet: <URL:http://www.sss-mag.com/ss.html>].

* cited by examiner

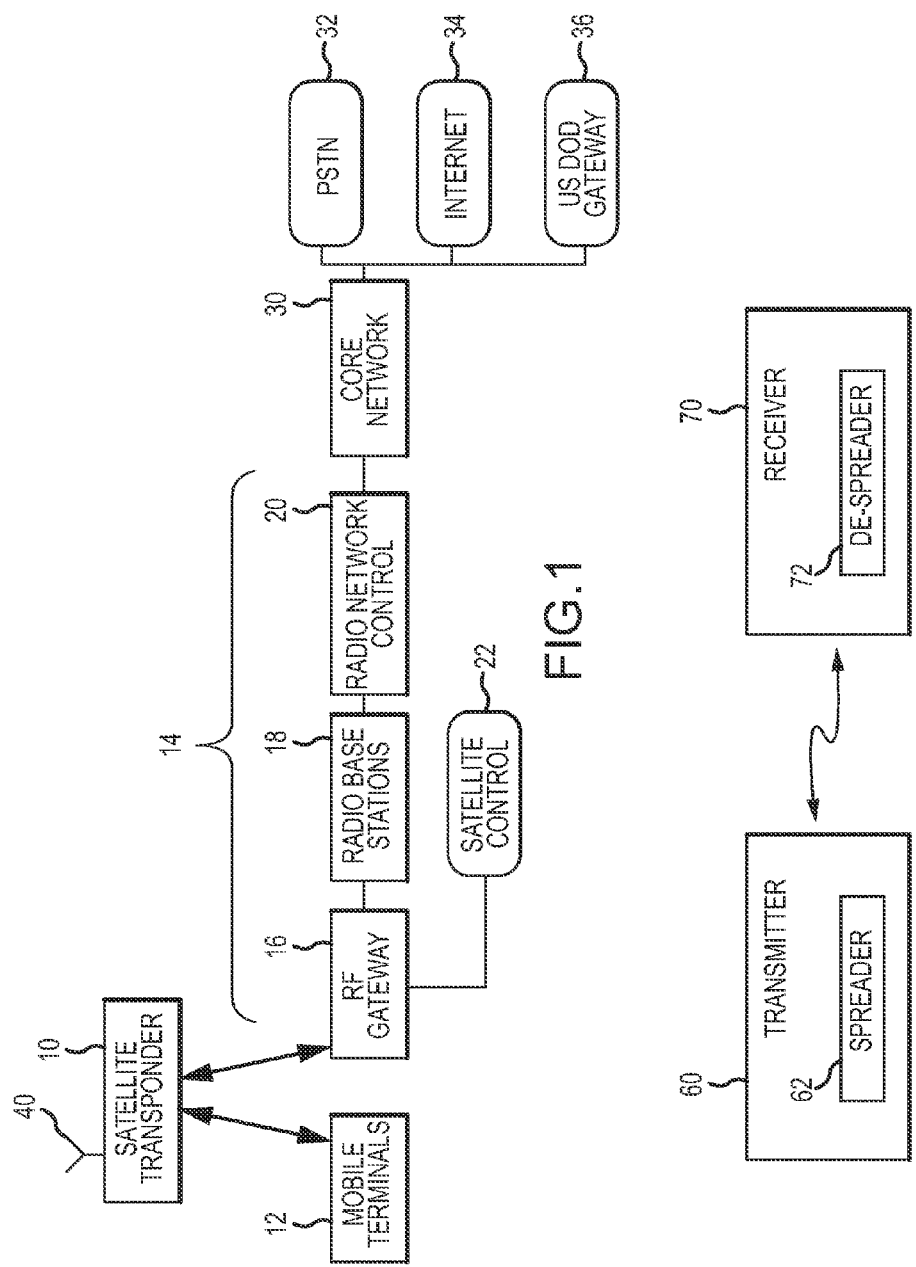

SATELLITE COMMUNICATIONS SYSTEM

CROSS-REFERENCES TO RELATED APPLICATIONS

This application is based on and claims the benefit of U.S. Provisional Patent Application No. 60/388,310, filed Jun. 14, 2002, the entire disclosure of which is incorporated herein by reference.

STATEMENT AS TO RIGHTS TO INVENTIONS MADE UNDER FEDERALLY SPONSORED RESEARCH OR DEVELOPMENT

The Government has rights in this invention pursuant to Contract N00039-04-C-2009 awarded by the Department of the Navy.

BACKGROUND OF THE INVENTION

The present invention relates generally to satellite communications systems and, more particularly, to a satellite system employing spread spectrum waveform protocols.

Wireless communication is widespread between mobile users for transmitting information such as voice, data, and video. Initially, ground based cells or repeater stations were employed to transmit the information to the mobile users but they limited communication to certain distances between the mobile users and the ground stations. Increasingly, satellites are used to remove such limitations. The use of satellite for wireless communication is common for applications such as mobile phones and global positioning systems.

One problem facing satellite communications systems is the need to accommodate an increasing number of users. The need to achieve network capacity may come at the expense of quality of service. For example, one current method of increasing capacity relies on time division multiple access (TDMA) protocols, which uses a plurality of channels to transmit information. To increase capacity or the number of channels, this method divides a given time frame into more and more slots. Each slot is allowed less time with each successive division. Because the channel data rate has an upper bound determined by the physical characteristics of the satellite and the terminals, with each division a user can send less data. As the number of slots increases, the data rate for each user is decreased. In current military applications this has meant that voice service is being conducted at 2.4 kbps. The commercial standard in the cell phone industry is in the range of 11 kbps to 22 kbps for voice service. Existing wireline voice service is 64 kbps.

The UHF frequency band has been selected for military use. Current mobile terminal units for use with global UHF satellites are heavy, weighing about fifteen pounds or more. The mobile terminal units need large batteries and hardware due to the great power requirement for the signals to reach the current satellites. Because terrestrial users have primary rights to the UHF spectrum and UHF satellite users have only secondary rights, signals between the UHF satellites and ground terminals and units need to be sufficiently low in strength to be considered mere insignificant noise as compared to those for the primary users. That is, the UHF satellite communication needs to meet the earth power flux density limit. The constraints on power and satellite gain render it difficult to reduce the size and weight of mobile terminal units to mobile units comparable to a commercial mobile unit.

BRIEF SUMMARY OF THE INVENTION

Embodiments of the present invention are directed to a satellite communications system between satellites and terminal units that are sufficiently small to be handheld units and that operate within the earth power flux density limit. The system is particularly suited for military use. This is accomplished by using spreading spectrum waveform protocols that make efficient use of the allocated bandwidth. These protocols increase processing gain so that less power is required for communication, thereby meeting the earth power flux density limit and reducing the power supply needed for the mobile terminal units. Consequently, handheld mobile units are possible.

The satellite communications system provides a larger system capacity over the UFO (UHF Follow On) legacy system, and has the ability to provide telecommunication services to disadvantaged users and to provide increased quality of service to disadvantaged users and simultaneously maintain high system capacity. The system provides data rates to mobile users and handheld terminals from 5 kbps to about 384 kbps. The system also can provide automated network control and user mobility management. In specific embodiments, the use of UHF allows users to operate in warfighting environments (e.g., double canopy). Furthermore, the system provides more robust communications during naturally occurring scintillation environments, is more tolerant to terrestrial interference, reduces cost by using a bent-pipe satellite payload and ground networking equipment, and can provide near global coverage. Lower cost is possible by using open standards, such as wideband code division multiple access (WCDMA), universal mobile telecommunications system (UMTS), or the like. Soft handovers between operating regions are automatic.

In accordance with an aspect of the present invention, a satellite communications system comprises at least one satellite, and at least one ground station each corresponding to one of the at least one satellite. Each ground station includes a spread spectrum transmitter and a spread spectrum receiver. Each of a plurality of mobile terminals includes a spread spectrum transmitter and a spread spectrum receiver. The spread spectrum transmitter of the at least one ground station is configured to communicate via the corresponding satellite with the spread spectrum receivers of the mobile terminals, and the spread spectrum receiver of the at least one ground station is configured to communicate via the satellite with the spread spectrum transmitter of the mobile terminals, using spread spectrum signals generated from baseband information signals narrower in bandwidth than the spread spectrum signals.

In some embodiments, each satellite is a bent-pipe transponder. Each ground station includes an RF gateway to provide RF communication with the corresponding satellite. Each ground station includes a radio base station to process signals received by the ground station, and a radio network controller configured to set a minimum signal to noise ratio. The radio base station is configured to adjust a power command and send the power command to a mobile terminal via the satellite to adjust a power of the mobile terminal based on the signals received from the mobile terminal and the minimum signal to noise ratio set by the radio network controller. The radio base station is configured to send the power command to the mobile terminal approximately once every 1-2 seconds. Each ground station includes a radio network controller configured to interface with a core network for communication with one or more terrestrial systems. The spread spectrum transmitter and the spread spectrum receiver of each ground station are configured as a ground station spread spectrum transceiver, and the spread spectrum transmitter and the spread spectrum receiver of each mobile terminal are configured as a mobile terminal spread spectrum transceiver. Each spread spectrum transmitter has a spreader to spread the baseband information signals to generate the spread spectrum signals. Each spread spectrum receiver has a de-spreader to recover the baseband information signals from the spread spectrum signals.

In accordance with another aspect of the invention, a satellite communication method comprises generating spread spectrum signals from baseband information signals narrower in bandwidth than the spread spectrum signals in a mobile terminal; transmitting the spread spectrum signals generated in the mobile terminal to a satellite; transmitting the spread spectrum signals from the satellite to a ground station; and recovering the baseband information signals from the spread spectrum signals received by the ground station from the satellite.

In some embodiments, the spread spectrum signals are transmitted between the satellites and the mobile terminals at UHF frequencies only. Ka-band frequencies are typically used between the satellites and the ground stations. The spread spectrum signals are transmitted by the satellite at a spectral power density which falls below an earth power flux density limit. The earth power flux density limit is about −145.8 to about −138 dBW/kHz/m$^2$. The spread spectrum signals are provided in a plurality of about 5 MHz contiguous channels for a total spectrum of about 20 MHz to about 40 MHz. The method further comprises processing the baseband information signals received by the ground station. The method further comprises transmitting spread spectrum signals from the ground station to the satellite; transmitting the spread spectrum signals from the satellite to the mobile terminal; and recovering baseband information signals from the spread spectrum signals received by the mobile terminal from the satellite.

BRIEF DESCRIPTION OF THE DRAWINGS

FIG. 1 is a simplified schematic view illustrating a satellite communications system according to an embodiment of the present invention; and FIG. 2 is a simplified block diagram illustrating communication between a spread spectrum transmitter and a spread spectrum receiver according to an embodiment of the present invention.

DETAILED DESCRIPTION OF THE INVENTION

FIG. 1 shows a satellite 10 which communicates with a plurality of mobile terminals 12. The satellite 10 also communicates with a ground station or base station 14, for instance, via an RF gateway 16 which may be provided with satellite control 22. The ground station 14 further includes radio base stations 18 and radio network controller 20. A core network 30 is coupled with the ground station 14 and provides a terrestrial-based high capacity backbone to facilitate connection with various terrestrial systems such as PSTN 32, the Internet 34, US DoD gateway 36, and the like. Although only one satellite 10 and one ground station are shown, the satellite communications system typically includes a number of satellites 10 and a corresponding number of ground stations. In alternative embodiments, some satellites may have two corresponding ground stations, with feeder link(s) to one or both ground stations. The additional ground station for the satellite provides redundancy. If the satellite has feeder links to both ground stations, each feeder link will typically handle 50% of the communications.

The satellite 10 is typically a geosynchronous satellite orbiting around a geosynchronous orbital arc. The satellite may orbit in low, medium, or high earth orbits. Each satellite 10 provides access to communications services for terrestrial users such as the mobile terminals 12 within the field of view of the satellite 10. The mobile terminals 12 may be handsets, computers, personal digital assistants, terminals mounted on mobile platforms, or the like. Various frequencies may be used for communication between the satellite 10 and mobile terminals 12 and ground stations 14. In specific embodiments, the communication is made via RF link using UHF frequencies between about 240 MHz and about 400 MHz.

Spread spectrum signals are preferably used. Spread spectrum uses wide band, noise-like signals. Because spread spectrum signals are noise-like, they are hard to detect, and are hard to intercept or demodulate. Spread spectrum signals are also harder to jam than narrowband signals. The low probability of intercept and anti-jam features render spread spectrum particularly suitable for military use. Spread spectrum signals are intentionally made to be much wider band than the information they are carrying to make them more noise-like. Spread spectrum signals use fast codes that run many times the information bandwidth or data rate. These spreading codes are called pseudo random or pseudo noise codes. They are pseudo codes because they are not real Gaussian noise.

Spread spectrum transmitters use similar transmit power levels to narrow band transmitters. Because spread spectrum signals are so wide, they transmit at a much lower spectral power density, measured in Watts per Hertz, than narrowband transmitters. This lower transmitted power density characteristic is advantageous not only because spread and narrow band signals can occupy the same band with little or no interference, but because the lower power density can meet the earth power flux density limit and makes it possible to reduce the size and weight of the mobile terminals 12.

The spread spectrum modulation techniques are characterized by wide frequency spectra. The modulated output signals occupy a much greater bandwidth than the signal's baseband information bandwidth. To qualify as a spread spectrum signal, the transmitted signal bandwidth is much greater than the information bandwidth, and some function other than the information being transmitted is employed to determine the resultant transmitted bandwidth. Frequency hopping and direct sequence are examples of known techniques for spread spectrum modulation.

As shown in FIG. 2, the spread spectrum transmitter 60 has a spreader 62 which spreads the narrow information bandwidth to the spread spectrum bandwidth prior to transmitting the spread spectrum signal to the spread spectrum receiver 70. The receiver 70 has a de-spreader which recovers narrowband information from the spread spectrum signals received from the spread spectrum transmitter 60. The spread spectrum receiver 70 uses a locally generated replica pseudo noise code and a receiver correlator to separate only the desired coded information from all possible signals. The receiver correlator is essentially a special matched filter that responds only to signals which are encoded with a pseudo noise code that matches its local code. The spread spectrum transmitters and spread spectrum receivers are provided in the mobile terminals 12 and ground stations 14. The spread spectrum transmitter and the spread spectrum receiver in a mobile terminal 12 or a ground station 14 may be configured as a spread spectrum transceiver.

The satellite 10 typically has a bent-pipe transponding payload, which translates the UHF spread spectrum to and from a higher RF frequency such as Ka-Band (20 GHz to 31 GHz) or the EHF Band (31 GHz to 45 GHz). Each ground station 14 provides the RF gateway 16 from the satellite 10 into the ground processing and networking infrastructure. In addition to providing a gateway for communications and communication services, the ground station 14 provides in-band telemetry, tracking, and control (TT&C) connectivity between the satellite 10 and ground based satellite control facilities. The RF gateway ground equipment 16 translates the high frequency RF into a standard RF interface defined by the radio base station equipment 18 and demultiplexes the communications traffic and the TT&C signals. The radio base station 18 generally operates in the L-Band and/or S-Band frequencies. The ground station 14 manages the radio links and provides signal processing functions. These functions may include, for example, equalization, power control, channel coding, and encryption. Of course, the ground station 14 may perform other functions as well. In alternative embodiments, the satellite 10 may be configured to perform certain processing functions that are performed by the ground station 14 in the embodiment shown.

The radio network controller 20 performs control functions. For example, the radio network controller 20 manages the radio network and the radio resources in the network, manages the switching between the ground stations 14, and provides the interface to the core network 30. The core network 30 provides communications routing functions, circuit switching and packet switching functions, and transcoding between the communication systems and external systems such as the PSTN 32. It also provides the interfaces to the PSTN 32 and IP networks, manages the user databases, and provides accounting and usage functions and user authentication. The ground core network 30 provides a plurality of communications services between fixed wiring users and mobile users including, for example, point-to-point connections, netted connections, paging, short messaging services, video streaming, e-mail, and the like.

In an exemplary embodiment, the satellites are arranged in a constellation. The satellite constellation is arranged so as to cover the globe within, for example, ±70 degrees latitude. Each ground station 14 is arranged to provide connectivity to two or more satellites 10. The plurality of ground stations 14 are interconnected using, for example, terrestrial-based high capacity backbones, such as the core networks 30 as shown in FIG. 1. The backbone provides the communications and control pathways between ground stations 14 and mobile terminals or user terminals 12 being served by different satellites 10. In addition, the backbone can provide connectivity to facilities such as satellite control facilities and centralized network management facilities.

In operation, a user obtains service by sending a service request from the mobile terminal 12. The service request is transmitted to the satellite 10 using a spread spectrum waveform at a predetermined UHF frequency. The frequency of the signal is up-converted to, for example, the Ka-Band or the EHF Band. The up-converted signal is then transmitted to the appropriate ground station 14. At the ground station 14, the frequency of the signal is converted to the predetermined ground station frequency (e.g., S-Band). The ground station 14 uses spread spectrum signal processing techniques to recover the digital signal which contains the service request. This signal is then passed on to the core network 30.

The core network 30 authenticates the users by, for example, checking to verify that they have an active user profile as part of the system database. This profile can include authentication information, priority information, services that are available to a particular user, and the like. After the core network 30 verifies that service can be granted to the user of a mobile terminal 12, the radio network controller 20 is directed to provide the necessary radio resources. The core network 30 locates the user terminal(s) 12 that is or are to be connected, and performs control signaling to set up a connection. After the connection is established, the radio network controller 20 manages the radio resources to maintain the connection. When a user terminal 12 signals the completion of the connection, the core network 30 will terminate the connection. After the connection is terminated, the radio network controller 20 releases the radio resources so that they can be reused.

The use of wideband spread spectrum waveform provides the processing gain for receiving or detecting signals that allows the mobile terminal 12 to be reduced to the size and weight of a handheld device. For example, if the signal requires 20 KHz but is spread over a 5 MHz spectrum, the processing gain is 250 and less power is required per Hz. Theoretically, the spread spectrum has no limit. Currently, the spread spectrum is typically in the range of about 5-20 MHz. The substantial reduction in power requirement means significantly smaller battery or power source and antenna are needed for the mobile terminals 12. For a UHF satellite, the use of the spread spectrum waveform protocol further ensures that the UHF satellite communication meets the earth power flux density limit. For instance, the earth power flux density limit may be about −145.8 to about −138 dBW/kHz/m². The sum of the powers from satellites 10 will need to be smaller than that limit.

To operate within the earth power flux density limit, the antenna 40 for the satellite 10 will need to be sufficiently large and sensitive to receive the signals at the relatively low powers. For a UHF satellite, the minimum gain to temperature (G/T) ratio as a measure of sensitivity is typically about 0 dB/K. In one example, the size of the antenna is about 14 meters in diameter. The antenna 40 of the satellite 10 is desirably a multibeam antenna including a plurality of beams that each have a sufficiently high gain by meeting the minimum gain to temperature ratio. The beams are earth coverage beams that cover the visible Earth to transmit and receive signals. Signals may pass through multiple beams in the satellite 10. The signals from the multiple beams to the ground station 14 are desirably combined in a beam combining scheme employed by the radio base station 18 to produce a high gain.

The ground station 14 performs a closed loop power control that adjusts the power of the mobile terminals 12 to meet preset target signal strength levels to avoid frame errors or the like. The closed loop power control includes an inner loop at the radio base station 18 and an outer loop at the radio network controller 20. The outer loop is a slower loop in terms of time, and the radio network controller 20 sets the signal to noise ratio. At the inner loop, the radio base station 18 adjusts the power commands and sends them to the mobile terminals 12 to increase or decrease the power needed to send signals based on the signal strength required to satisfy the signal to noise ratio while meeting the earth power flux density limit. Thus, the inner loop is a faster loop in terms of time than the outer loop since the radio base station 18 is making adjustments to meet the target signal strength in terms of signal to noise ratio set by the radio network controller 20 at the outer loop. The mobile terminal 12 adjusts the power commands and sends them to the radio base station 18 to increase or decrease the power needed to send signals based on the signal strength requirement to satisfy the signal to noise ratio while meeting the earth power flux density limit. The present power control tracks better the channel dynamics or variations. In some embodiments, more power than needed is used (e.g., 1-6 dBW more). This reduces capacity, but ensures that the user terminals 12 are not dropped during communication.

Whereas normal terrestrial systems typically require power command update approximately every 10 milliseconds, the present system operates with power command update approximately every 0.5-2 seconds, more desirably about 1-2 seconds only. Typically, the round trip transmission time between the ground station and the user terminal is about 0.5 second. Providing power command update will require additional time. The propagation channel can vary on the order of about 0.3 second, with little or no benefit in trying to track the power requirements more frequently. As it turns out, experiments show that the less frequent updating smoothes out variations in the channel, reducing the frame error rate. Due to the faster rate of the channel than the update rate, the power consumption is higher for the satellite or mobile terminals.

The present system employing spread spectrum waveform is a power efficient system that produces a significant increase in capacity by a factor of about twenty or higher. The number of simultaneous calls increases substantially. There is also an increase in the grade of service. For example, a previous data transmission rate of about 2.4 kbps is the lowest common denominator. The rate increases to about 4.8 kbps in the present system. In specific embodiments, the wideband spread spectrum waveform protocol at UHF is used for communication to and from the user terminals. The concept supports any type of spread spectrum waveform including CDMA, WCDMA, frequency hopping, DSS, and the like.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A satellite communications system comprising:
   at least one satellite;
   at least one ground station each corresponding to one of the at least one satellite, each ground station including a spread spectrum transmitter and a spread spectrum receiver; and
   a plurality of mobile terminals, each mobile terminal including a spread spectrum transmitter and a spread spectrum receiver;
   wherein the spread spectrum transmitter of the at least one ground station is configured to communicate via the corresponding satellite with the spread spectrum receivers of the mobile terminals and wherein the spread spectrum receiver of the at least one ground station is configured to communicate via the satellite with the spread spectrum transmitter of the mobile terminals, using spread spectrum signals generated from baseband information signals narrower in bandwidth than the spread spectrum signals;
   wherein the at least one ground station each includes a radio base station to process signals received by the at least one ground station; and
   wherein the at least one ground station each includes a radio network controller configured to set a minimum signal to noise ratio, and wherein each mobile terminal is configured to adjust a power command and send the power command to the radio base station of the ground station via the satellite to adjust a power of the ground station based on the signals received from the ground station and the minimum signal to noise ratio set by the radio network controller.

2. The satellite communications system of claim 1 wherein the at least one satellite and the plurality of mobile terminals are configured to communicate at UHF frequencies only.

3. The satellite communications system of claim 1 wherein the spread spectrum signals are transmitted by the at least one satellite at a spectral power density which falls below an earth power flux density limit.

4. The satellite communications system of claim 3 wherein the earth power flux density limit is about −145.8 to about −138 dBW/kHz/m$^2$.

5. The satellite communications system of claim 1 wherein the spread spectrum signals are provided in a plurality of about 5 MHz contiguous channels for a total spectrum of about 20 MHz to about 40 MHz.

6. The satellite communications system of claim 1 wherein the at least one satellite each is a bent-pipe transponder.

7. The satellite communications system of claim 1 wherein the at least one ground station each includes an RF gateway to provide RF communication with the corresponding satellite.

8. The satellite communications system of claim 1 wherein the at least one ground station each includes a radio network controller configured to set a minimum signal to noise ratio, and wherein the radio base station is configured to adjust a power command and send the power command to a mobile terminal via the satellite to adjust a power of the mobile terminal based on the signals received from the mobile terminal and the minimum signal to noise ratio set by the radio network controller.

9. The satellite communications system of claim 8 wherein the radio base station is configured to send the power command to the mobile terminal approximately once every 1-2 seconds.

10. The satellite communications system of claim 1 further comprising a core network, and wherein the at least one ground station each includes a radio network controller configured to interface with the core network for communication with one or more terrestrial systems.

11. The satellite communications system of claim 1 wherein the at least one satellite antenna receiving from the mobile terminals has a minimum gain to temperature ratio of about 0 dB/K.

12. The satellite communications system of claim 1 wherein the at least one satellite each includes at least one multibeam antenna.

13. The satellite communications system of claim 1 wherein the spread spectrum transmitter and the spread spectrum receiver of each ground station are configured as a ground station spread spectrum transceiver, and wherein the spread spectrum transmitter and the spread spectrum receiver of each mobile terminal are configured as a mobile terminal spread spectrum transceiver.

14. The satellite communications system of claim 1 wherein each spread spectrum transmitter has a spreader to spread the baseband information signals to generate the spread spectrum signals, and wherein each spread spectrum receiver has a de-spreader to recover the baseband information signals from the spread spectrum signals.

15. A satellite communication method comprising:
generating spread spectrum signals from baseband information signals narrower in bandwidth than the spread spectrum signals in a mobile terminal;
transmitting the spread spectrum signals generated in the mobile terminal to a satellite;
transmitting the spread spectrum signals from the satellite to a ground station; and
recovering the baseband information signals from the spread spectrum signals received by the ground station from the satellite;
setting a minimum signal to noise ratio in the ground station;
adjusting a power command in the mobile terminal to adjust a power of the ground station based on the signals received from the ground station and the minimum signal to noise ratio; and
sending the power command from the mobile terminal to the ground station via the satellite.

16. The method of claim 15 wherein the spread spectrum signals are transmitted between the mobile terminal and the satellite at UHF frequencies only.

17. The method of claim 15 wherein the spread spectrum signals are transmitted by the satellite at a spectral power density which falls below an earth power flux density limit.

18. The method of claim 17 wherein the earth power flux density limit is about −145.8 to about −138 dBW/kHZ/m$^2$.

19. The method of claim 15 wherein the spread spectrum signals are provided in a plurality of about 5 MHz contiguous channels for a total spectrum of about 20 MHz to about 40 MHz.

20. The method of claim 15 further comprising processing the baseband information signals received by the ground station.

21. The method of claim 15 further comprising setting a minimum signal to noise ratio in the ground station, adjusting a power command in the ground station to adjust a power of the mobile terminal based on the signals received from the mobile terminal and the minimum signal to noise ratio, and sending the power command from the ground station to the mobile terminal via the satellite.

22. The method of claim 21 wherein the power command is sent by the ground station approximately once every 1-2 seconds.

23. The method of claim 15 further comprising:
transmitting spread spectrum signals from the ground station to the satellite;
transmitting the spread spectrum signals from the satellite to the mobile terminal; and
recovering baseband information signals from the spread spectrum signals received by the mobile terminal from the satellite.

24. A satellite communications system comprising:
at least one satellite;
at least one ground station each corresponding to one of the at least one satellite, each ground station including a spread spectrum transmitter and a spread spectrum receiver;
a plurality of mobile terminals, each mobile terminal including a spread spectrum transmitter and a spread spectrum receiver; and
a core network, wherein the at least one ground station each includes a radio network controller configured to interface with the core network for communication with one or more terrestrial systems;
wherein the spread spectrum transmitter of the at least one ground station is configured to communicate via the corresponding satellite with the spread spectrum receivers of the mobile terminals and wherein the spread spectrum receiver of the at least one ground station is configured to communicate via the satellite with the spread spectrum transmitter of the mobile terminals, using spread spectrum signals generated from baseband information signals narrower in bandwidth than the spread spectrum signals.

* * * * *